United States Patent
Gamble

(10) Patent No.: US 11,644,063 B2
(45) Date of Patent: May 9, 2023

(54) SELF-PUMPING OIL CRANKSHAFT

(71) Applicant: KISS-Engineering Inc., Northridge, CA (US)

(72) Inventor: Christopher L. Gamble, Canoga Park, CA (US)

(*) Notice: Subject to any disclaimer, the term of this patent is extended or adjusted under 35 U.S.C. 154(b) by 190 days.

(21) Appl. No.: 17/230,522

(22) Filed: Apr. 14, 2021

(65) Prior Publication Data

US 2022/0333636 A1  Oct. 20, 2022

(51) Int. Cl.
*F16C 3/14* (2006.01)

(52) U.S. Cl.
CPC ..................... *F16C 3/14* (2013.01)

(58) Field of Classification Search
CPC ............... F16C 3/14; F16C 2360/22
USPC ..................................... 74/595–605
See application file for complete search history.

(56) References Cited

U.S. PATENT DOCUMENTS

| | | | | |
|---|---|---|---|---|
| 2008/0257319 A1* | 10/2008 | Ishizaka | ............... | F02M 35/168 123/572 |
| 2018/0347620 A1* | 12/2018 | Yanus | ..................... | F04B 47/02 |
| 2020/0208548 A1* | 7/2020 | Murrish | .................... | F01M 1/08 |
| 2020/0309187 A1* | 10/2020 | Yamamoto | ................ | F16C 3/14 |

FOREIGN PATENT DOCUMENTS

| | | | | |
|---|---|---|---|---|
| CA | 3007089 A1 * | 1/2018 | ................ | F16C 3/14 |
| DE | 102007025470 A1 * | 6/2008 | ................ | F16C 3/14 |
| DE | 102008036174 A1 * | 11/2009 | ................ | F01M 1/06 |
| DE | 102015115669 A1 * | 3/2017 | ................ | F16N 1/00 |
| GB | 2187817 A * | 9/1987 | ................ | F16C 3/14 |
| WO | WO 97/13983 * | 4/1997 | ................ | F16C 3/14 |

OTHER PUBLICATIONS

Define funnel, Microsoft Bing, Dec. 14, 2022 (Year: 2022).*
Machine Translation of DE 102007025470 A1, Andreas et al., Jun. 12, 2008 (Year: 2008).*
Machine Translation of DE 102008036174 A1, Andreas, Nov. 12, 2009 (Year: 2009).*
Machine Translation of WO 97/13983, Gonzalez et al., Apr. 17, 1997 (Year: 1997).*
Machine Translation of DE 102015115669 A1, Bramberger et al. Mar. 23, 2017 (Year: 2017).*

* cited by examiner

*Primary Examiner* — Vinh Luong
(74) *Attorney, Agent, or Firm* — Michael A DiNardo; Iain Hill; YK Law, LLP

(57) ABSTRACT

An improved crankshaft for an internal combustion engine with a self-pumping feature for oil to lubricate the rod bearing journals. Leading faces of the lobes carrying the rod bearing journals contain funnel ports to gather oil as the crankshaft rotates about its axis of rotation. The funnel ports are fluidly connected to an internal passageway within the crankpin. Outlet ports oriented radially inwards and outwards from the internal passageway allow the oil to flow into the space between the crankpin and the rod bearing. In this way, as the crankshaft rotates within the crank housing, oil captured by the funnel ports flows through the internal passageway and through the outlet ports so as to lubricate the rod bearing around the crankpin.

14 Claims, 7 Drawing Sheets

SELF-PUMPING OIL CRANKSHAFT

BACKGROUND OF THE INVENTION

The present invention is directed to an improvement of a crankshaft in a combustion engine. Specifically, the inventive crankshaft includes structural features that result in the automatic internal lubrication of the crankpin journal relative to the rod bearing as a result of rotation of the crankshaft.

Prior art crankshafts are known to include a series of connected internal passageways to conduct oil therethrough. The internal passageways in the prior art crankshafts typically formed one continuous passageway from the flywheel flange through all of the journals to the pulley end of the crankshaft. A pump proximate the flywheel flange would then force oil through all of the passageways so as to lubricate the rod bearing journals. Engines using this prior art crankshaft required additional equipment like the pump which occupied space in the engine or engine compartment, as well as caused a potential point of failure in the engine.

FIG. 1 illustrates a prior art crankshaft 10 that has been used in the marketplace. This prior art crankshaft 10 has the typical configuration of radially spaced rod journals 12' disposed along an axis of rotation 14 between a flywheel flange 16 and a pulley end 18 of the crankshaft 10. Along the axis of rotation are main bearing journals 20. One or more rod bearing crankpins 22 are disposed along the crankshaft radially away from the axis of rotation 14. Opposite each rod bearing journal 12' and crankpin 22 is a counterweight 24. In this prior art crankshaft, a plurality of oil passageways 26 connect from the flywheel flange 16 through each of the main journals 20 and rod journals 12' to the pulley end 18 of the crankshaft 10. A pump motor (not shown) would be attached to one end of the crankshaft 10 so as to force oil through the passageways 26, thereby lubricating the rod journals 12' when the crankshaft 10 was in operation.

Accordingly, there is a need for an improved crankshaft that allows for lubricating the rod bearing journals without the drawback of requiring additional pump motors or experiencing a potential failure of such pump motors. The present invention fulfills these needs and provides other related advantages.

SUMMARY OF THE INVENTION

The present invention is directed to an oil self-pumping crankshaft for an internal combustion engine. The inventive crankshaft has a typical configuration, including a flywheel flange at one end and a pulley attachment at an opposite end. Between the ends are main bearing journals disposed along an axis of rotation and offset rod bearing journals disposed radially away from the axis of rotation with counterweights disposed on the opposite side of the main bearing journals. The crankpin or rod bearing journal has an internal fluid passageway extending between the rod lobes. A leading face of each rod lobe includes a funneled opening in fluid communication with the passageway in the crankpin journal. The crankpin journal further includes a central outlet port in fluid communication with the passageway, the outlet port being oriented radially outwards from the axis of rotation of the crankshaft.

As the inventive crankshaft rotates, the funneled openings on the leading face of the rod lobes capture oil in the crankshaft housing. Because the funneled openings are on the leading face of the rod lobes, the direction of rotation of the crankshaft forces oil through into funneled openings, to the passageway inside the crankpin journal, which oil then flows through the outlet opening so as to lubricate between the crankpin journal and the rod bearing.

The present invention is directed to a crankshaft for an engine having a rod bearing journal radially offset from an axis of rotation of the crankshaft. The crankshaft includes a funnel port on a leading face of the rod bearing journal relative to a direction of rotation. An internal passageway parallel to the axis of rotation is within the rod bearing journal, wherein the internal passageway is in fluid communication with the funnel port. An outlet port in the rod bearing journal is in fluid communication with the internal passageway.

The outlet port is oriented radially away from and perpendicular to the axis of rotation. The crankshaft further includes a second outlet port in the rod bearing journal in fluid communication with the internal passageway. The second outlet port is oriented radially toward and perpendicular to the axis of rotation.

The rod bearing journal includes a crankpin fixed between two rod lobes that extend radially away from the axis of rotation. The funnel port is disposed on the leading face on one of the rod lobes. The crankshaft further includes a second funnel port on the leading face on another of the rod lobes and in fluid communication with the internal passageway.

The crankshaft has a plurality of rod bearing journals disposed along the crankshaft, each rod lobe and crankpin having a funnel port on a leading face, an internal passageway in the crankpin, and an outlet port, wherein each of the funnel port, internal passageway, and outlet port are in fluid communication within a single rod bearing journal.

The crankshaft may be a one-piece molded assembly. The crankshaft may be a machined assembly with each rod bearing journal joined together by main bearing journals along the axis of rotation, with mating posts and slots having matching hex-shaped cross-sections.

In a particularly preferred embodiment, the crankshaft for an engine having a rod bearing journal radially offset from an axis of rotation of the crankshaft has in combination: the rod bearing journal having a crankpin fixed between two rod lobes that extend radially away from the axis of rotation; a pair of funnel ports on a leading face of each of the rod lobes relative to a direction of rotation; an internal passageway parallel to the axis of rotation within the crankpin, wherein the internal passageway is in fluid communication with each of the pair of funnel ports; and an outlet port in the rod bearing journal in fluid communication with the internal passageway.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The present invention is directed to an improved crankshaft for an internal combustion engine that provides improved lubrication of the crankpin journals and rod bearings.

Figure 1:
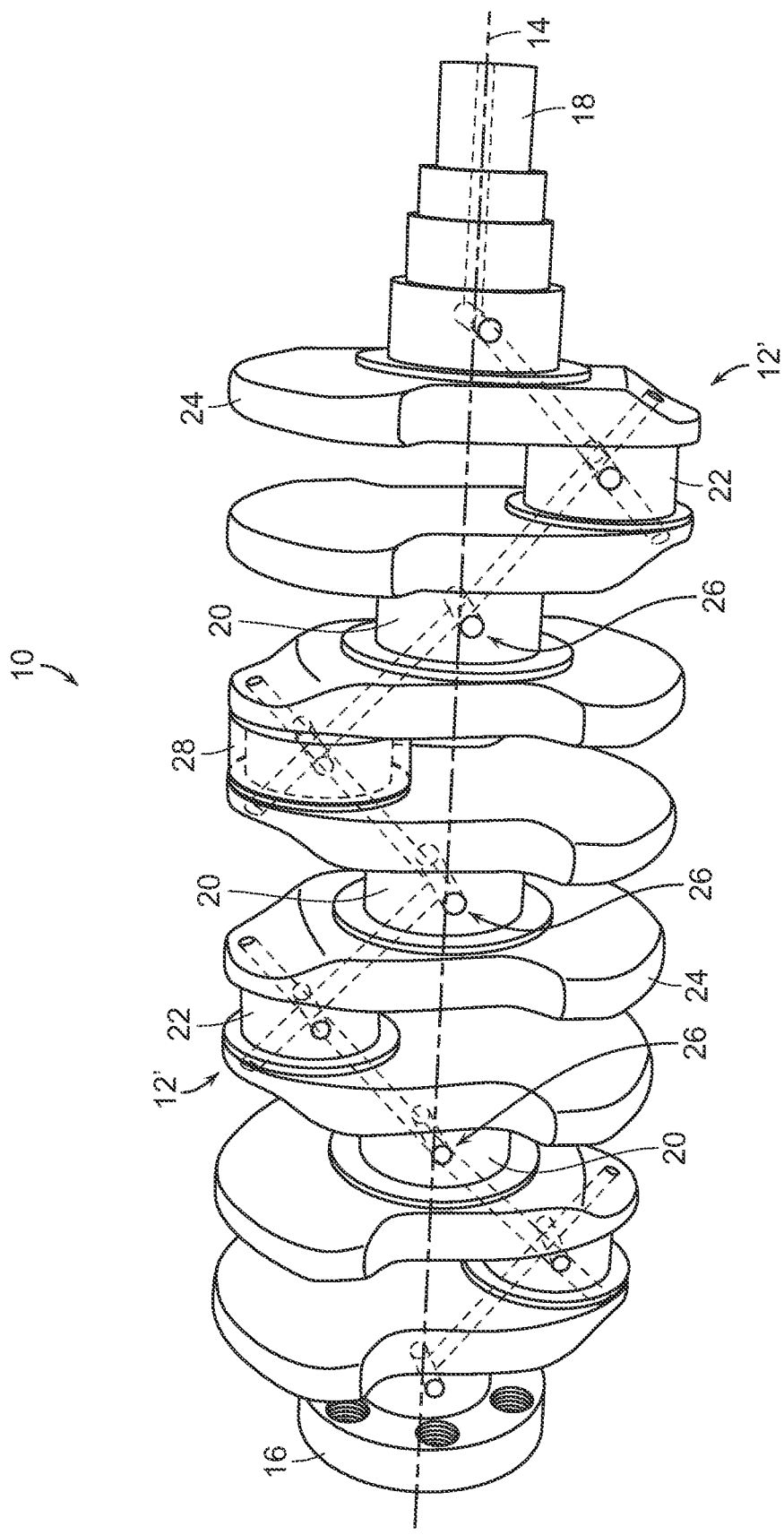
FIG. 1 is an illustration of a prior art crankshaft for an internal combustion engine.
Figure 2:
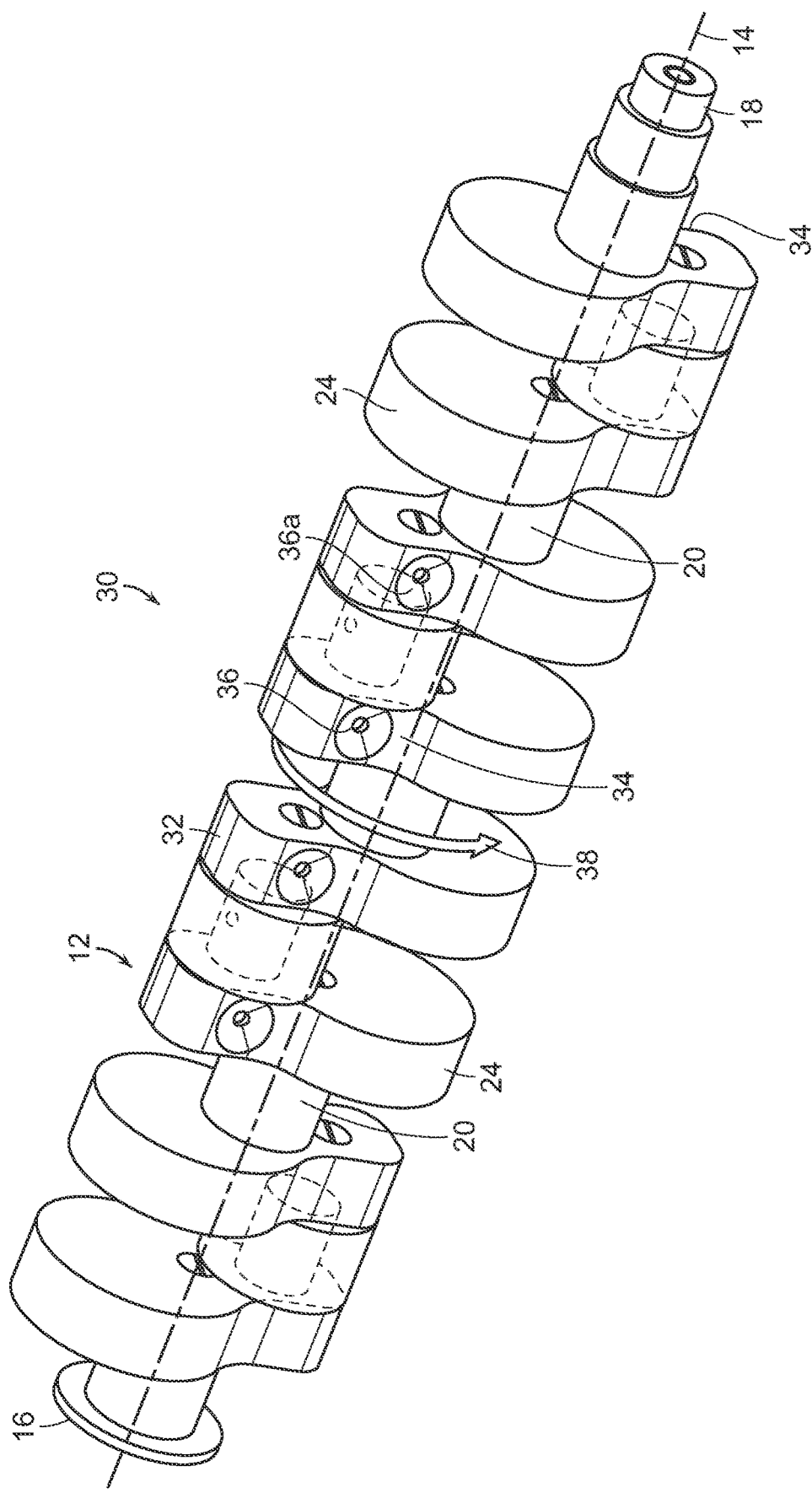
FIG. 2 is a perspective view of a particular embodiment of the crankshaft of the present invention.

FIG. 2 illustrates the inventive crankshaft, referred to herein by reference numeral 30 in the following description. The inventive crankshaft 30 has similar basic components of the prior art crankshaft including the rod bearing journals 12, the axis of rotation 14, the flywheel flange 16, the pulley end 18, the main bearing journals 20, the crankpins 22, and the counterweights 24. The improvement in the inventive crankshaft 30 resides in how oil is introduced to the crankshaft 30 for lubricating the rod journals 12.

Each rod bearing journal 12 includes a rod lobe 32 that extends away from the main bearing journals 20 and axis of rotation 14 generally opposite counterweight 24. The rod lobes 32 and counterweights 24 are preferably provided in pairs. The crankpins 22 extend between a pair of rod lobes 32. In this way, the crankpins 22 are radially offset from the main bearing journals 20. The counterweight 24 is disposed opposite each rod lobe 32 so as to counterbalance the weight and force exerted on the rod bearing journal 12 during rotation of the crankshaft 30.

As is typical, multiple rod bearing journals 12 are disposed along the length of the crankshaft 30. Those multiple rod bearing journals 12 are disposed in relative radially spaced orientations 22a, 22b, 22c, 22d depending on the configuration and timing of the engine containing the crankshaft 30. In the inventive crankshaft 30, the leading face 34 of each rod lobe 32 includes a funnel port 36 surrounded by a funnel-shaped countersink 36a leading to the interior of the rod lobes 32. In this context, the leading face 34 is defined as the face of the rod lobe 32 oriented in the direction of rotation 38 of the crankshaft 30 around the axis of rotation 14.

In the crankshaft 30 illustrated in FIG. 2, the leading faces 34 of the rod lobes 32 in the second and third rod bearing journals 22b, 22c face out of the paper following the direction of rotation 38. In the same crankshaft 30 shown in FIG. 2, the funnel ports 36 on the leading faces 34 of the rod lobes 32 on the first and fourth rod bearing journals 22a, 22d are not illustrated because they are facing into the paper only to be visible in this view once the crankshaft 30 rotates ninety degrees in the direction of rotation 38. The funnel-shaped countersink 36a helps guide oil that impacts the leading face 34 into the funnel port 36.

Figure 3:
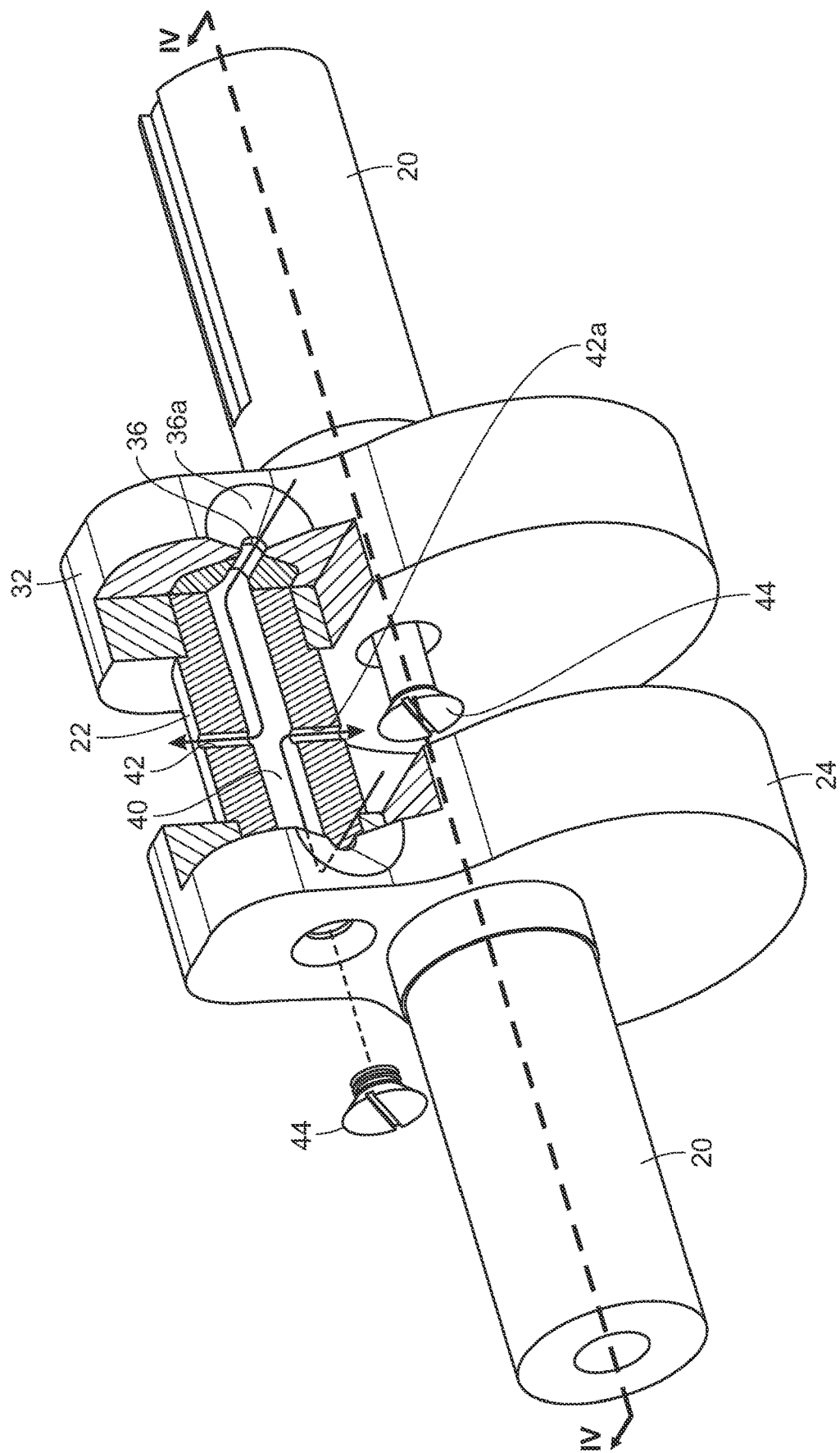
FIG. 3 is a partial cutaway view of a particular embodiment of a rod lobe and crankpin journal of the crankshaft of the present invention.
Figure 4:
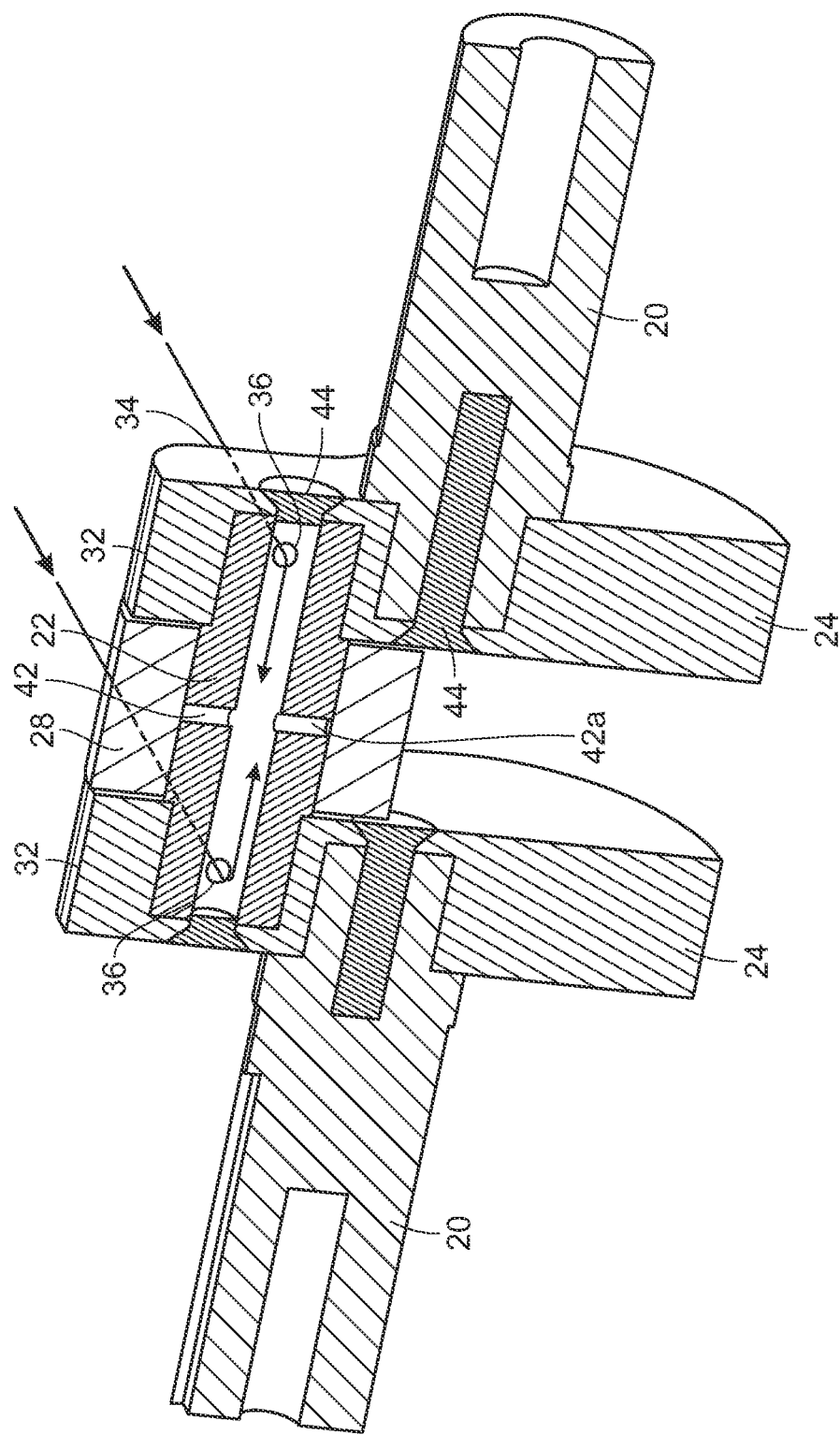
FIG. 4 is a cross-sectional view of a particular embodiment of a rod lobe, crankpin journal, and rod bearing of the crankshaft of the present invention taken along line IV-IV of FIG. 3.

As shown in FIGS. 3 and 4, the funnel ports 36 fluidly communicate with an internal passageway 40 in the crankpin 22. The internal passageway 40 preferably extends between the funnel ports 36 on two adjacent rod lobes 32. Within the internal passageway 40 one or more outlet ports 42. If only one outlet port 42 is included, it is preferably oriented on "top" of the crankpin 22, such that the outlet port 42 extends radially away from the axis of rotation. If a second outlet port 42a is included, it is preferably oriented on "bottom" of the crankpin 22 extending radially toward the axis of rotation 14. One or both outlet ports 42, 42a fluidly communicate with the outer surface 23 of the crankpin 22.

With the funnel ports 36 disposed on the leading faces 34 of the rod lobes 32, the direction of rotation 38 forcing the funnel ports 36 into oil present in the crankcase is sufficient to force the oil into the funnel ports 36. From there the oil is fluidly communicated into the internal passageway 40 and through the outlet ports 42. When the rod bearings 28 are disposed around the crankpin 22, the outlet ports 42 allow for oil to reach the outer surface 23 and enter the space between the crankpin 22 and rod bearing 28, providing sufficient lubrication for operation.

Figure 5:
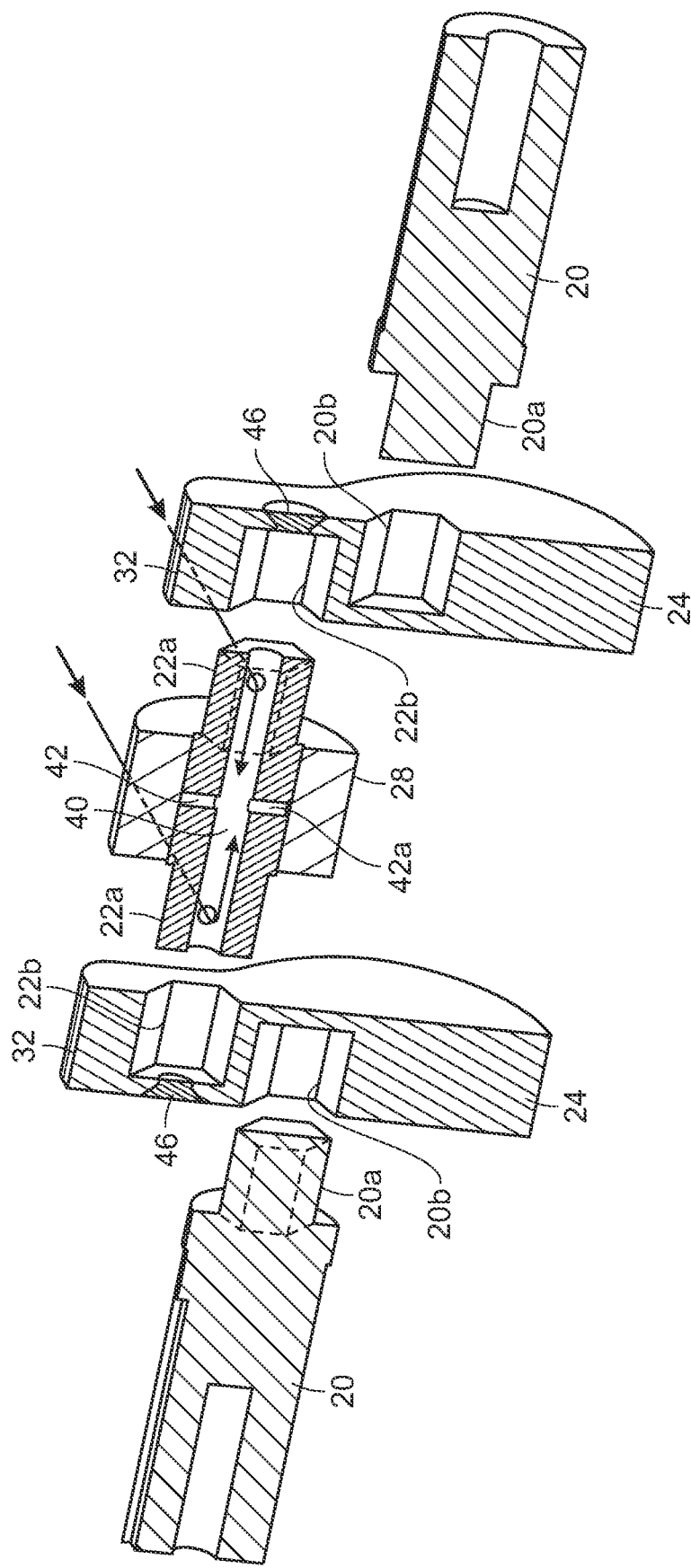
FIG. 5 is an exploded, cross-sectional view similar to FIG. 4 view of a particular embodiment of the crankshaft of the present invention where the components are fit together by cold welding.

As shown in FIGS. 3 and 4, the various components of the crankshaft 30, i.e., main journals 20, rod journals 12, and crankpins 22, may be assembled by threaded connections and screws. When assembled in this way, the screws 44 on the rod bearing journals 12 extend far enough into the opening to secure to the crankpin 22 while sealing the ends of the internal passageway 40. In addition, as shown in FIG. 5, the connections between the main bearing journals 20, the counterweights 24, the rod lobes 32, and the crankpin 22 may all have polygonal cross-sections, preferably hex shaped cross-sections, so that they are more securely locked in relative positions—minimizing the need for "truing" of the forged components for proper alignment. The main journals 20 may preferably include a hex-shaped stem or mating post 20a that fits into a hex-shaped channel or slot 20b between the rod lobe 32 and counterweight 24. Similarly, the crankpin 22 may preferably include a hex-shaped stem or mating post 22a that fits into a hex-shaped channel or slot 22b in the rod lobe 32. In this construction, the screws 44 may be eliminated provided the polygonal stems 20a, 22a and polygonal channels 20b, 22b are sufficiently joined as by cold welding or similar securing means.

Figure 6:
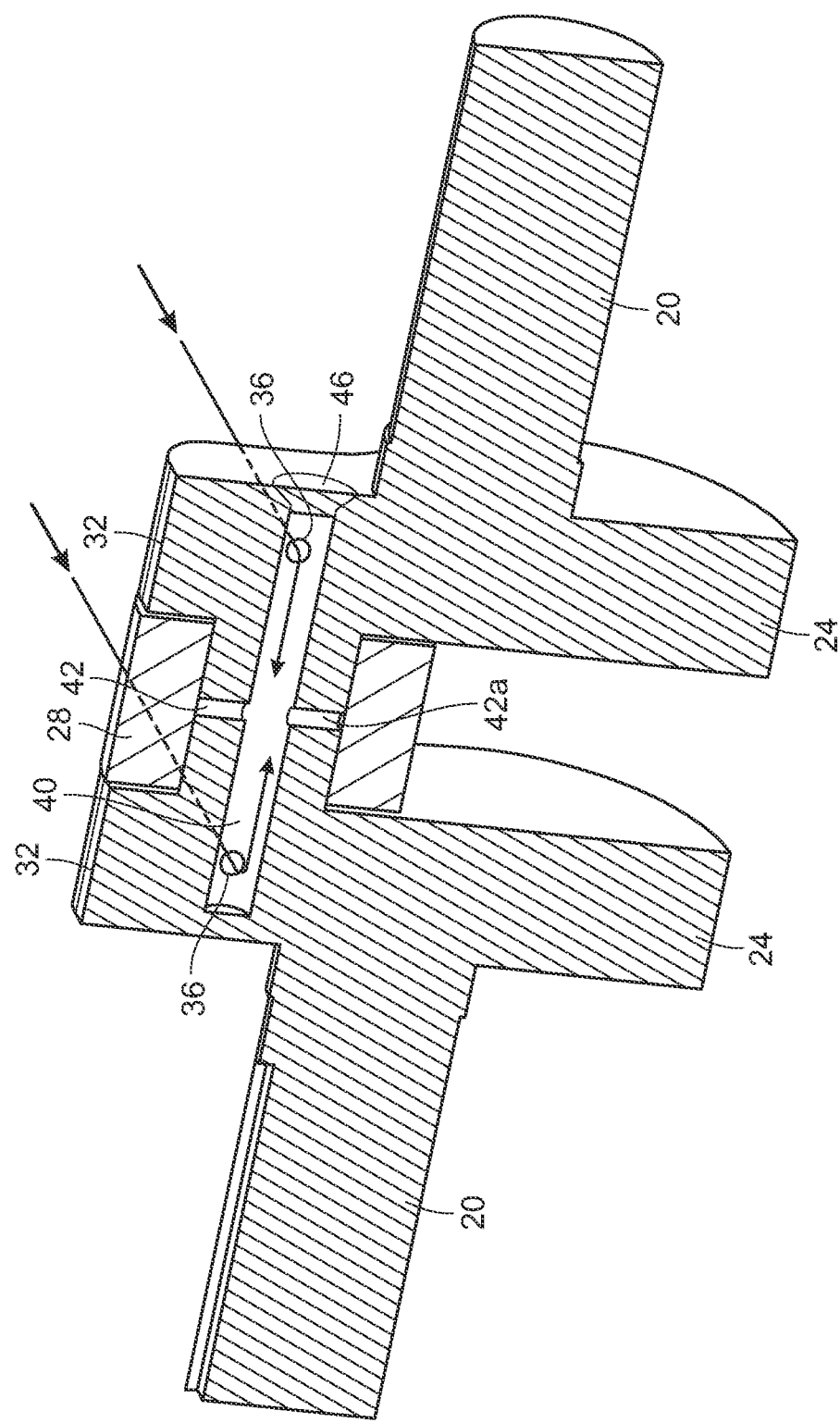
FIG. 6 is a cross-sectional view similar to FIG. 4 of a particular embodiment of the crankshaft of the present invention where the components are forged as a single piece.

Alternatively, as shown in FIG. 6, the main bearing journals 20, rod journals 12, and crankpins 22 of the crankshaft 30 are all molded as a one-piece unit. In this way, the funnel port 36 and internal passageway 40 may be formed by drilling either partially or completely through the crankpin 22 from outside the rod lobe 32. Once the internal passageway 40 is drilled through the crankpin 22, one or both ends of the internal passageway 40 may be filled with a screw 44, weld bead 46, or similar closure. Similarly, the funnel ports 36 may be drilled through the leading face 34 of the rod lobes 32 to intercept the internal passageway 40. The funnel ports 36 may be drilled as by a countersink or similar tool to create the funnel shape 36a. This one-piece molded crankshaft 30 provides a more stable and reliably reproduceable unit.

Figure 7:
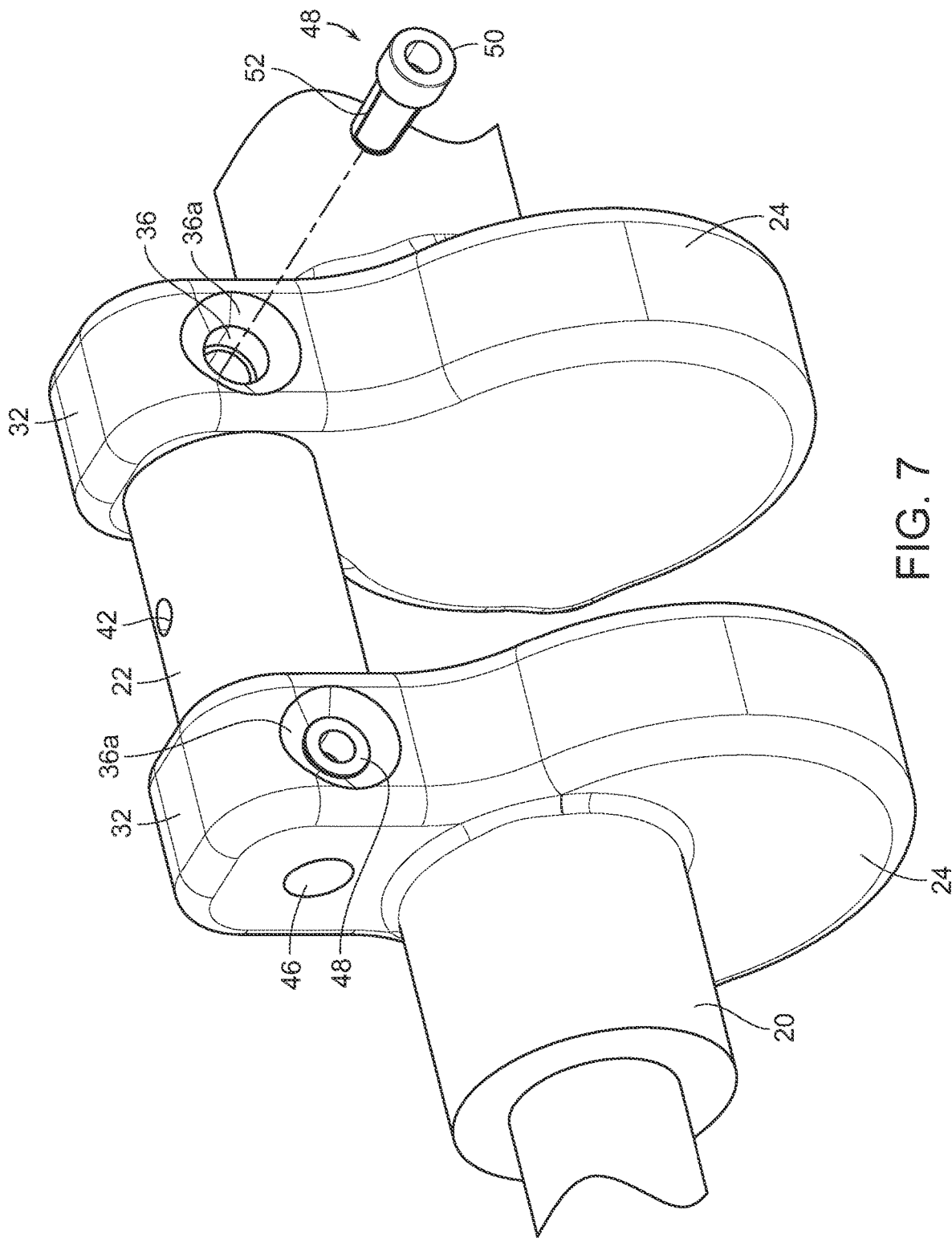
FIG. 7 is a close-up perspective view of a particular embodiment of a rod bearing journal on the crankshaft of the present invention.

In an alternate embodiment, FIG. 7 shows a close-up view of a particular rod journal 12 that includes filter elements 48 configured for insertion into the funnel ports 36. The filter elements 48 may include a port ring 50 configured to tightly fit into the opening of the funnel port 36 flush with the bottom of funnel shape 36a. A filter body 52 protrudes from the port ring 50 configured to extend through the funnel port 36 toward the internal passageway 40. Oil that flows into the filter body 52 is filtered before entering the internal passageway. The filter body 52 is preferably tapered as it extends away from the port ring 50 such that there is a space between the filter body 52 and inside walls of the funnel port 36. This configuration increases the surface area of the filter body 52 that can filter oil.

As is well known in combustion engines, the oil in the crankcase can become "dirty" with carbon deposits and other contaminants. Because the filter element 48 is removable, the filter element 48 can be cleaned or replaced if the filter material gets clogged with too many contaminants after use.

Various detailed embodiments of the present invention are disclosed herein. However, it should be understood, that the disclosed embodiments are merely exemplary of the invention, which may be embodied in various forms. Various modifications may be made without departing from the scope and spirit of the invention. Accordingly, the invention is not to be limited, except as by the appended claims.

What is claimed is:

1. A crankshaft (30) for an engine having a rod bearing journal (12) radially offset from an axis of rotation (14) of the crankshaft (30), comprising:
    a funnel port (36) on a leading face (34) of the rod bearing journal (12), such that the funnel port (36) is offset from the axis of rotation (14) and oriented in a direction of rotation;
    an internal passageway (40) parallel to the axis of rotation (14) within the rod bearing journal (12), wherein the internal passageway (40) is in fluid communication with the funnel port (36); and
    an outlet port (42) in the rod bearing journal (12) in fluid communication with the internal passageway (40).

2. The crankshaft (30) of claim 1, wherein the outlet port (42) is oriented radially away from and perpendicular to the axis of rotation (14).

3. The crankshaft (30) of claim 2, further comprising a second outlet port (42a) in the rod bearing journal (12) in fluid communication with the internal passageway (40), wherein the second outlet port (42a) is oriented radially toward and perpendicular to the axis of rotation (14).

4. The crankshaft (30) of claim 1, wherein the rod bearing journal (12) comprises a crankpin (22) fixed between two rod lobes (32) that extend radially away from the axis of rotation (14), wherein the funnel port (36) is disposed on the leading face (34) on one of the rod lobes (32).

5. The crankshaft (30) of claim 4, further comprising a second funnel port (36) on the leading face (34) on another of the rod lobes (32) and in fluid communication with the internal passageway (40).

6. The crankshaft (30) of claim 1, wherein the rod bearing journal (12) comprises a plurality of rod bearing journals (12) disposed along the crankshaft (30), each of the plurality of rod bearing journals (12) having a crankpin (22) fixed between two rod lobes (32), wherein the funnel port (36) comprises a plurality of funnel ports (36), with one of the plurality of funnel ports (36) disposed on the leading face (24) of each of the rod lobes (32) of each of the plurality of rod bearing journals (12), wherein the internal passageway (40) comprises a plurality of internal passageways (40) with one of the plurality of internal passageways (40) in the crankpin (22) of each of the plurality of rod bearing journals (12), wherein the outlet port (42) comprises a plurality of outlet ports (42, 42a) with one of the plurality of outlet ports (42, 42a) on the crankpin (22) of each of the plurality of rod bearing journals (12), and wherein each of the plurality of funnel ports (36), each of the plurality of internal passageways (40), and each of the plurality of outlet ports (42, 42a) are in fluid communication with each other within each of the plurality of rod bearing journals (12).

7. The crankshaft (30) of claim 6, wherein the crankshaft (30) is a one-piece molded assembly.

8. The crankshaft (30) of claim 6, wherein the crankshaft (30) is a machined assembly with each rod bearing journal (12) joined together by main bearing journals (20) along the axis of rotation (14), with mating posts (20a, 22a) and slots (20b, 22b) having matching hex-shaped cross-sections.

9. A crankshaft (30) for an engine having a rod bearing journal (12) radially offset from an axis of rotation (14) of the crankshaft (30), comprising:
    wherein the rod bearing journal (12) comprises a crankpin (22) fixed between two rod lobes (32) that extend radially away from the axis of rotation (14);
    a pair of funnel ports (36) on a leading face (34) of each of the rod lobes (32) relative to a direction of rotation;
    an internal passageway (40) parallel to the axis of rotation (14) within the crankpin (22), wherein the internal passageway (40) is in fluid communication with each of the pair of funnel ports (36); and
    an outlet port (42) in the rod bearing journal (12) in fluid communication with the internal passageway (40).

10. The crankshaft (30) of claim 9, wherein the outlet port (42) is oriented radially away from and perpendicular to the axis of rotation (14).

11. The crankshaft (30) of claim 10, further comprising a second outlet port (42a) in the rod bearing journal (12) in fluid communication with the internal passageway (40), wherein the second outlet port (42a) is oriented radially toward and perpendicular to the axis of rotation (14).

12. The crankshaft (30) of claim 9, wherein the rod bearing journal (12) comprises a plurality of rod bearing journals (12) disposed along the crankshaft (30), each of the two rod lobes (32) and crankpin (22) on each of the plurality of rod bearing journals (12) having a funnel port (36) on a leading face (34), an internal passageway (40) in the crankpin (22), and an outlet port (42), wherein each of the funnel port (36), internal passageway (40), and outlet port (42) are in fluid communication within each of the plurality of rod bearing journals (12).

13. The crankshaft (30) of claim 12, wherein the crankshaft (30) is a one-piece molded assembly.

14. The crankshaft (30) of claim 12, wherein the crankshaft (30) is a machined assembly with each rod bearing journal (12) joined together by main bearing journals (20) along the axis of rotation (14), with mating posts (20a, 22a) and slots (20b, 22b) having matching hex-shaped cross-sections.

\* \* \* \* \*